No. 725,701. PATENTED APR. 21, 1903.
R. A. HALL.
MACHINE FOR MAKING AND INSERTING GASKETS.
APPLICATION FILED AUG. 16, 1901.
NO MODEL. 6 SHEETS—SHEET 1.

Fig. 1.

Inventor.
Robert A. Hall
by Philipp, Sawyer, Rice & Kennedy

Attest.
A. White

No. 725,701. PATENTED APR. 21, 1903.
R. A. HALL.
MACHINE FOR MAKING AND INSERTING GASKETS.
APPLICATION FILED AUG. 16, 1901.
NO MODEL. 6 SHEETS—SHEET 2.

Attest:
A. White
J. F. Kehoe

Inventor:
Robert A. Hall
by Philipp, Sawyer, Rice & Kennedy
Attys

No. 725,701. PATENTED APR. 21, 1903.
R. A. HALL.
MACHINE FOR MAKING AND INSERTING GASKETS.
APPLICATION FILED AUG. 16, 1901.
NO MODEL. 6 SHEETS—SHEET 3.

No. 725,701. PATENTED APR. 21, 1903.
R. A. HALL.
MACHINE FOR MAKING AND INSERTING GASKETS.
APPLICATION FILED AUG. 16, 1901.
NO MODEL. 6 SHEETS—SHEET 5.

Inventor:
Robert A. Hall
by Philipp, Sawyer, Rice & Kennedy
Attys

Attest:
A. White
J. F. Kehoe

No. 725,701. PATENTED APR. 21, 1903.
R. A. HALL.
MACHINE FOR MAKING AND INSERTING GASKETS.
APPLICATION FILED AUG. 16, 1901.
NO MODEL. 6 SHEETS—SHEET 6.

Inventor:
Robert A. Hall
by Philipp, Sawyer, Rice & Kennedy
Attys

Attest:
A. White
A. F. Kehoe

UNITED STATES PATENT OFFICE.

ROBERT A. HALL, OF NEW YORK, N. Y., ASSIGNOR TO THE AMERICAN TOBACCO COMPANY, OF NEW YORK, N. Y., A CORPORATION OF NEW JERSEY.

MACHINE FOR MAKING AND INSERTING GASKETS.

SPECIFICATION forming part of Letters Patent No. 725,701, dated April 21, 1903.

Application filed August 16, 1901. Serial No. 72,242. No model.

*To all whom it may concern:*

Be it known that I, ROBERT A. HALL, a citizen of the United States, residing at New York, county of New York, and State of New York, have invented certain new and useful Improvements in Machines for Making and Inserting Gaskets, fully described and represented in the following specification and the accompanying drawings, forming a part of the same.

This invention relates to certain improvements in machines for forming gaskets and placing them in position on that part of the receptacle which is to receive them.

One of the objects of this invention is to produce a machine in which a tube of gasket material shall be advanced and its end positioned on a support, suitable cutting devices being employed which will cut a gasket from the tube while it is in position on the support.

A further object of the invention is to provide an improved machine in which a gasket-carrying support is caused to place a gasket in position on that part of the receptacle which is to receive it.

A further object of the invention is to produce a machine in which a gasket shall be cut from the tube while the mouth of the tube is on the support, the support being thereafter so operated that the gasket without being removed therefrom shall be positioned on that part of the receptacle which is to receive it.

A further object of the invention is to produce improved mechanisms by which the operations of feeding a tube of gasket material, cutting a gasket therefrom, and placing the gasket in position are performed.

With these and other objects in view the invention consists in certain constructions and in certain parts, improvements, and combinations, as will be hereinafter fully described and then specifically pointed out in the claims hereunto appended.

In the accompanying drawings, in which like characters of reference indicate the same parts.

Figure 1:
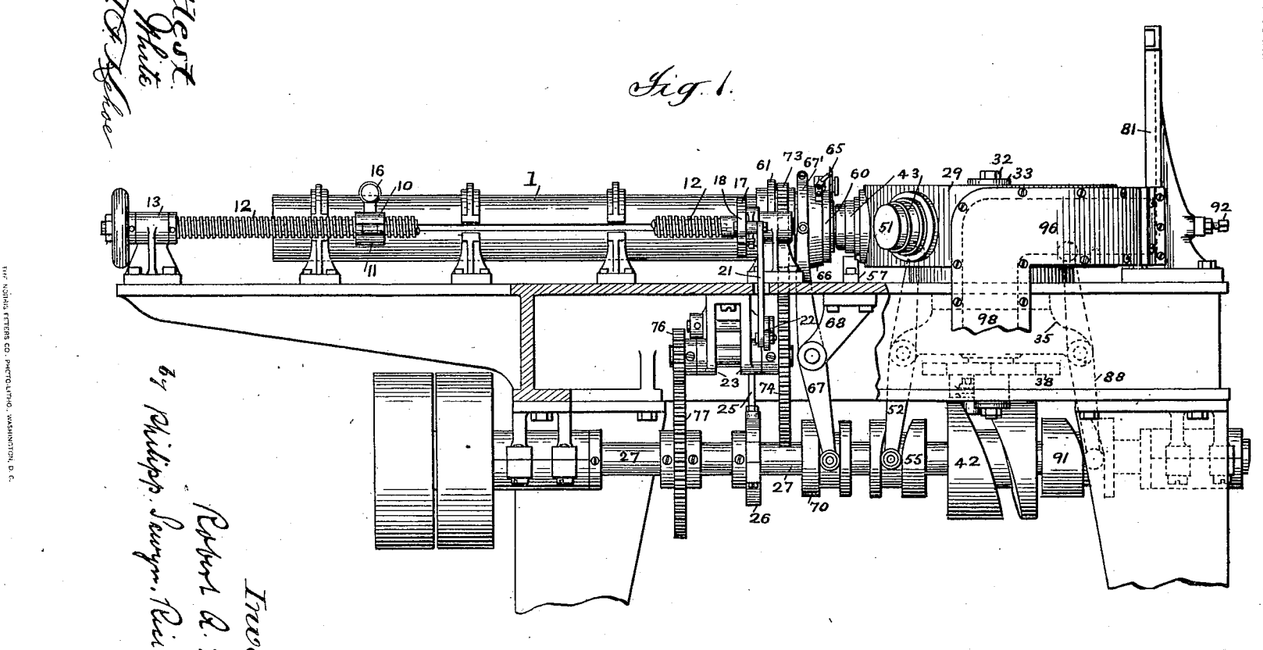
Figure 1 illustrates a side elevation of a machine constructed in accordance with the invention.
Figure 2:
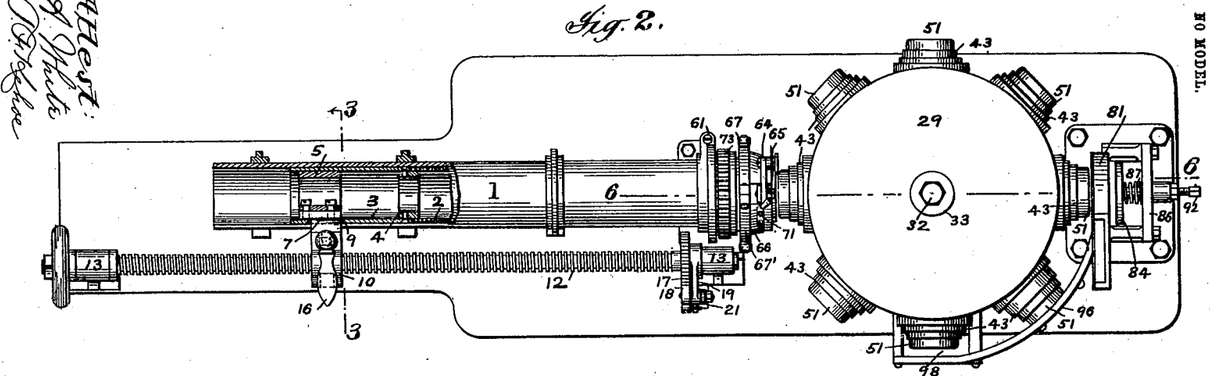
Fig. 2 is plan view of the machine illustrated in Fig. 1, certain parts being shown in section.
Figure 3:
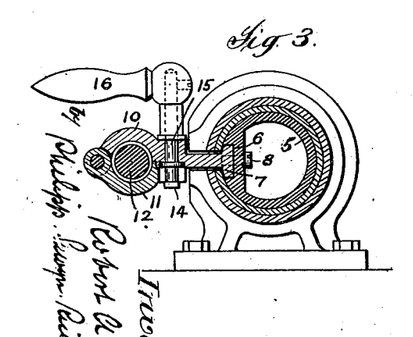
Fig. 3 is a section on the line 3 3 of Fig. 2.
Figure 4:
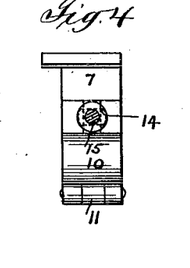
Fig. 4 is a detail plan view of the feeding-nut employed for advancing the feeding-plunger.
Figure 5:
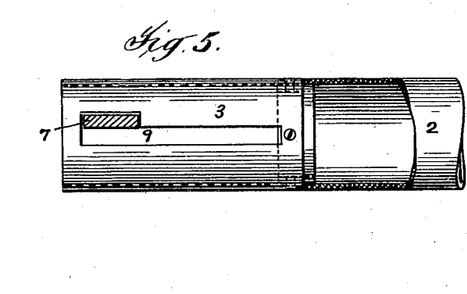
Fig. 5 is a detail plan view of the feeding-plunger employed for advancing the gasket-tube.
Figure 8:
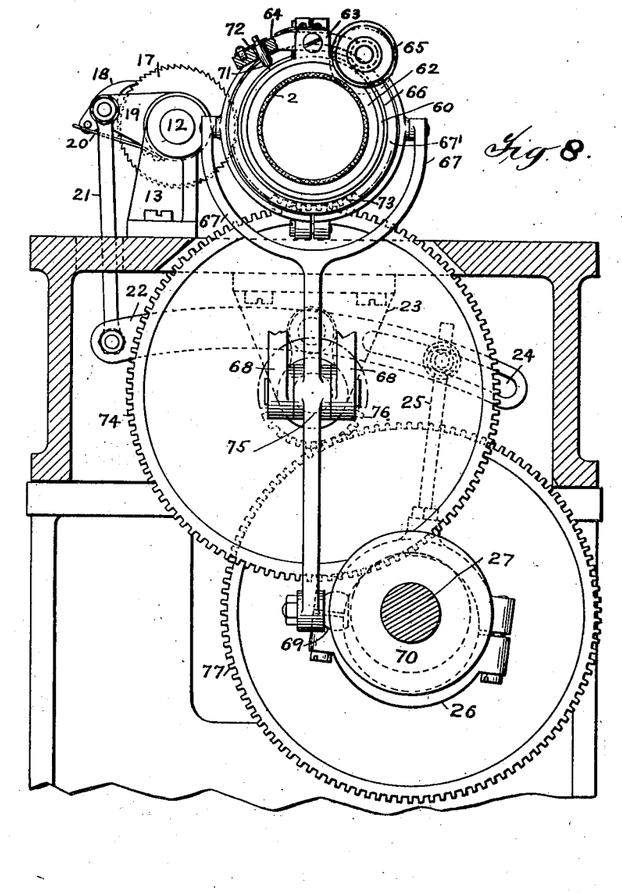
Fig. 8 is a section on the line 8 8 of Fig. 6, illustrating part of the gearing employed and certain operating connections and also the cutting mechanism.

The machine which has been selected to illustrate one embodiment of the invention employs suitable devices for advancing a tube of gasket material, said devices including a tube-guide. Although this tube-guide may be variously constructed, in the form of the machine which has been chosen to illustrate the invention it consists of a conduit 1, through the interior of which a tube of gasket material (marked 2) is advanced by suitable means. Any suitable means may be employed for advancing a tube of gasket material through the conduit. As shown, these means include a suitable plunger 3. (See Figs. 2 and 5.) This plunger 3 is tubular in form and of a diameter to snugly fit within the feed-conduit. It is preferably provided at its forward end with a collar 4, which projects slightly from the end of the plunger, so as to enter the end of the tube of gasket material and support it, said collar, together with the end of the plunger, forming a shoulder against which the end of the tube abuts and by which it is supported. The plunger is intermittently advanced through the tube by mechanism which may be variously constructed. As shown, the plunger is provided with an interior collar 5, which has a recess 6 in which fits a headed stem 7, said stem being secured in position in any suitable manner, as by means of screws 8. The plunger 3 is provided with a bayonet-shaped slot 9, through which the stem 7 projects. The stem 7 is formed to provide a boss 10, to which is hinged a half-nut 11, said nut being arranged to be engaged by a screw 12, which is suitably supported in bearings 13, mounted on the frame of the machine. The nut is held in position to engage the screw by means of a button 14, mounted on the end of a stem 15, which extends through the stem 7 and is provided with a suitable handle 16. By giving the handle a quarter-turn it will be seen that the button will be so positioned as to allow the half-nut 11 to drop and disengage its thread from the thread of the screw. The screw may be rotated, so as to advance the plunger in any suitable manner. As shown, it is provided with a ratchet 17, which is engaged by a pawl 18, mounted on a pawl-carrying arm 19, which is loosely journaled on one of the bearings 13. A suitable spring 20 is provided to hold the pawl in engaging position. The pawl-carrying arm is connected, by means of a link 21, (see Fig. 8,) to a lever 22, said lever being pivoted to one side of a two-part bracket 23. (See Fig. 1 and dotted lines in Fig. 8.) This lever 22 is provided with a slot 24, to which is adjustably connected an operating-rod 25, said rod being secured to an eccentric-collar 26, which surrounds an eccentric carried on the main shaft 27 of the machine. As the main shaft rotates it will be seen that through the connections described the plunger is given a step-by-step movement through the feed-conduit, and it forces the tube of gasket material through it. As the plunger moves forward the stem 7 is in the wide part of the bayonet-slot 9 and is bearing against the shoulder on it, the object being to insure that the entire length of tube is fed forward through the conduit. When the plunger has completed its forward movement and it is desired to insert a fresh length of tube, the button 14 is turned by means of the handle, and the nut 11 is allowed to drop out of engagement with the screw. The plunger can then be rapidly returned by hand until the boss 10 strikes the rear bearing 13, at which time the plunger will be almost but not fully withdrawn from the conduit. The plunger can then be seized by the hand and rotated slightly, so as to bring the stem into the lower part of the bayonet-slot, after which it can be slid back on the stem until it clears the conduit.

Figure 7:
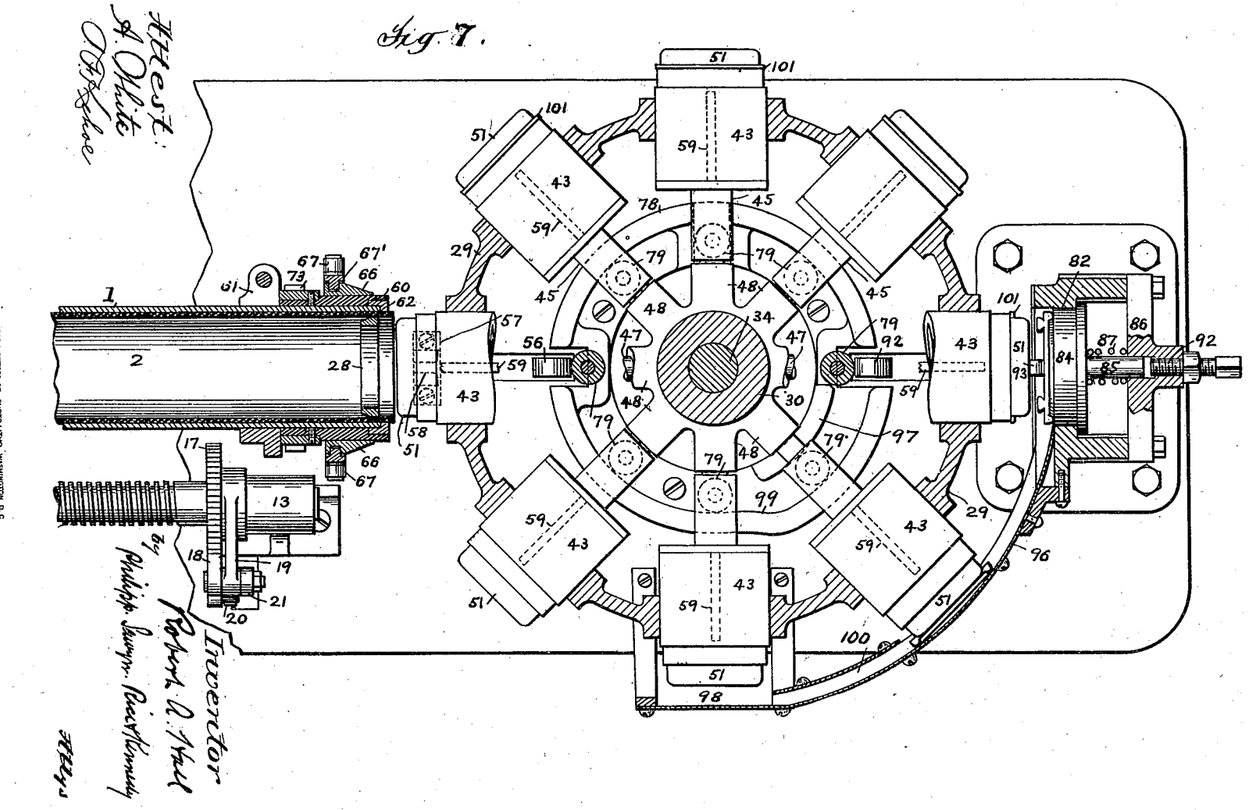
Fig. 7 is a plan view, certain parts being shown in section and certain parts being shown in elevation, this figure being on the same scale as Fig. 6.
Figure 12:
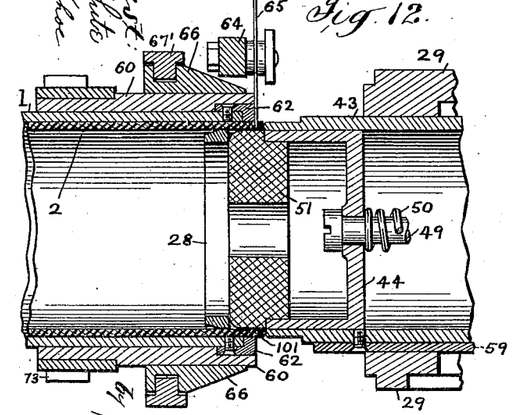
Fig. 12 is a sectional detail view, on an enlarged scale, illustrating the parts in the position they occupy when a gasket is being cut from the tube.

When the feeding mechanism before described is used for forwarding a flexible tube, as will be the case when the tube is used for making gaskets, it is desirable to provide some means for keeping the tube distended or, in other words, for preventing it from collapsing. The means which may be employed for this purpose may be considerably varied. In the construction shown, however, a loose guide 28 (see Figs. 7 and 12) is preferably employed, this guide being sufficiently smaller in circumference than the interior of the conduit to allow the tube to pass between it and the walls of the conduit. This guide-ring 28 is prevented from being carried out of the conduit with the tube by means which will be hereinafter referred to.

Figures 6, 14:
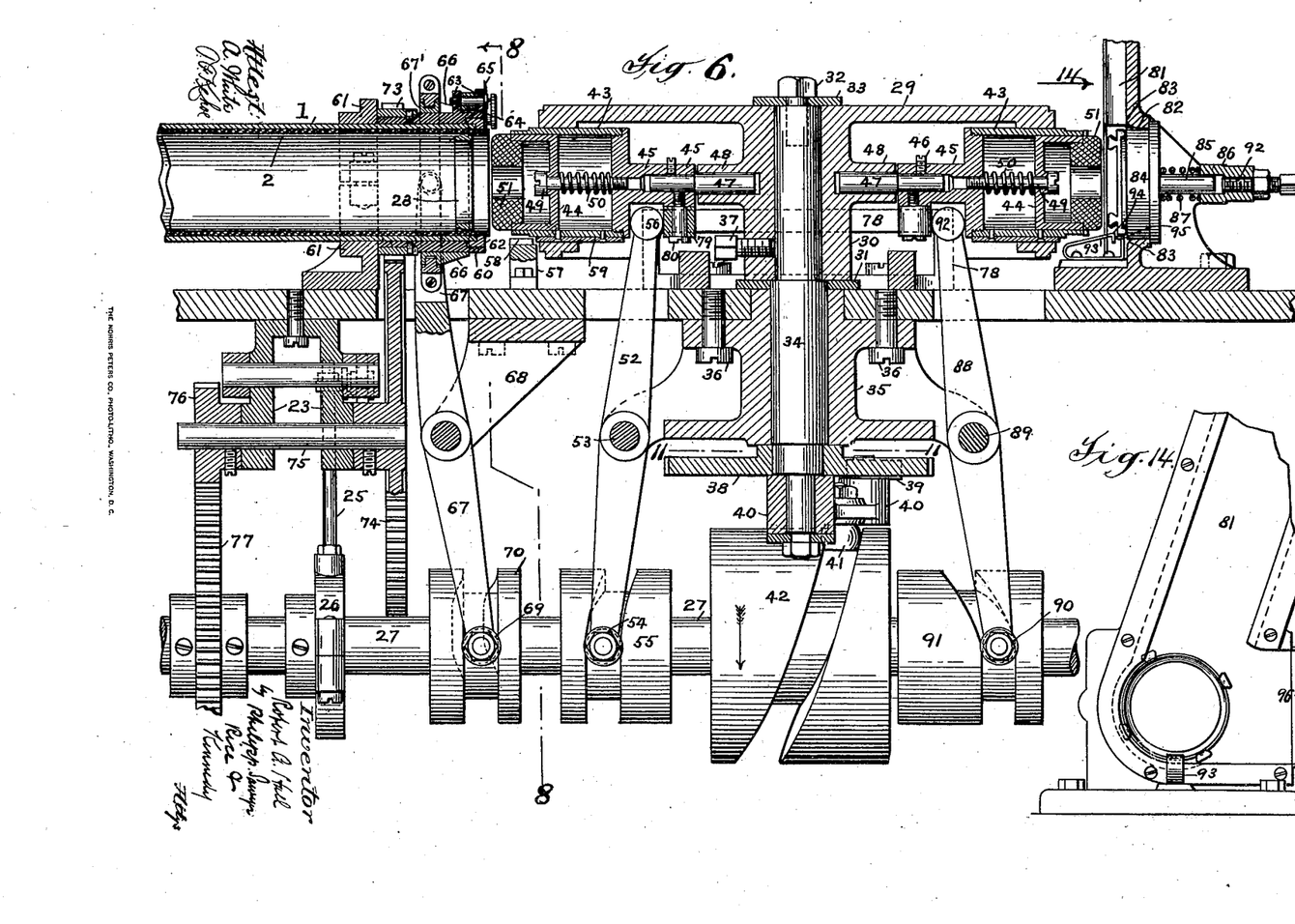
Fig. 6 is a section on the line 6 6 of Fig. 2 on an enlarged scale.
Fig. 14 is a detail view of the feed-chute looking in the direction of the arrow 14 in Fig. 6.
Figure 11:
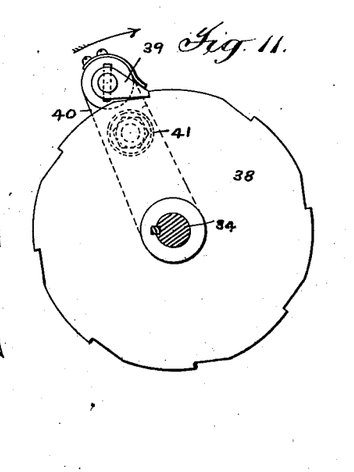
Fig. 11 is a sectional detail view on the line 11 11 of Fig 6, illustrating part of the mechanism for operating the carrier.

When a sufficient length of tube has been forced out of the conduit, so that a gasket can be cut therefrom, it will, when the apparatus is employed upon flexible tubes, be supported during the cutting operation. The means for supporting the end of the tube may be varied within wide limits. In the construction shown, however, there is provided a carrier 29, the hub 30 of which rests upon the bed of the machine or on a washer 31, supported thereon. The carrier has secured to it by means of a nut 32 and a washer 33, or in any other suitable manner, a vertical shaft 34, which passes through a bearing in a bracket 35, secured to the under side of the bed-plate of the machine by means of screws 36 or in any other suitable manner. The hub of the carrier and the shaft 34 are secured together by means of a set-screw 37 or in any other suitable manner. Any suitable means may be employed for rotating the shaft 34 to give the movement to the carrier. As shown, (see Figs. 6 and 11,) the lower end of the shaft is provided with a ratchet 38, which is engaged by a spring-pawl 39, carried on an arm 40, loosely journaled on the shaft and held in position thereon by means of a key or in any other suitable manner. This arm 40 has intermediate its ends a stud or bowl 41, which engages a groove in a cam 42, mounted on the main shaft 27 of the machine. As the main shaft rotates, therefore, it will be seen that the carrier will be given a step-by-step movement. The carrier 29 sustains the supporting devices for the end of the tube, and in a preferred form of the construction a plurality of said devices will be employed. As shown, the carrier serves to sustain eight supports, each of said supports including a plunger consisting of two parts 43 and 44. The part 43 of each plunger is provided with a rearwardly-extending hub 45, and in this hub is secured, by means of a set-screw 46 or in any other suitable manner, a stem 47, which works in a socket 48, formed in the hub 30 of the carrier. The two parts of each plunger are preferably formed so that they may have a relative movement with respect to each other for a purpose which will be hereinafter described. While the construction by which this relative movement between the two parts of the plunger is attained may be varied widely, as shown the part 44 is mounted inside the part 43, which is made cup-shaped, the said part 44 being also cup-shaped and arranged to fit snugly within the cup of the plunger 43. The base of the cup-shaped part 44 is perforated and through it passes the headed stem 49, which is secured to the cup 43 in any suitable manner, as by means of threads, a spring 50 surrounding the stem and serving to hold the base of the part 44 against the head of the stem. The part 44 carries a block 51, against which the cutting device, to be hereinafter described, operates. In order to prevent dulling the cutter, this block is formed of yielding material—as, for instance, hard fiber—although any suitable substance may be employed. The plungers or supports are so positioned on the carrier and so related to the step-by-step mechanism by which the carrier is moved that each movement of the carrier brings a plunger in position in front of the mouth of the tube. After each plunger has been brought into position in front of the mouth of the tube it is necessary that a relative movement be effected between the tube and the support which will cause the end of the tube to be positioned on the support. While this might be effected by a movement given the tube it will preferably be effected by moving the support. The movement of the support may be effected in any desired manner. Preferably, however, there is provided a lever 52, which is pivoted at 53 to the bracket 35, the lower end of said lever carrying a bowl 54, which engages a suitably-formed groove in a cam 55, mounted on the shaft 27. The other end of the lever 52 is provided with a boss or enlargement 56, which takes behind the base of the cup 43 of the plunger as the same comes into position in front of the tube, after which the cam 55 throws the lever, thus causing the plunger or support to enter the end of the tube which has been projected from the feed-conduit. It will of course be understood that the step-by-step movement by which the carrier is advanced stops before or at about the time the two-part plunger, forming the support, begins its forward movement, and the carrier remains at rest until a gasket has been cut from the tube. It will be further seen that as the block 51 enters the mouth of the tube it will force the guide-ring 28 backward and prevent it from being fed out by the forward movement of the tube.

A locking and centering device is preferably provided which will not only insure the accurate forward movement of the plunger, but will also prevent the carrier from moving until the cutting operation is completed and the plunger has been retracted, carrying the severed gasket. This locking and centering device may be of any desired construction; but in the preferred form of the invention a grooved block 57 is provided, which is secured to the bed-plate of the machine, said block having a groove 58 on its upper face. This groove 58 is engaged by a rib 59, one of said ribs being secured to the under side of the part 43 of each support. As a support moves forward, therefore, this rib engages the groove 58, the centering action being facilitated by the rounded edges of the groove, which are clearly shown in Fig. 7. When the rib 59 has passed into engagement with the groove, the carrier is locked, and no further movement can take place until the plunger has been retracted.

Figures 9, 10:
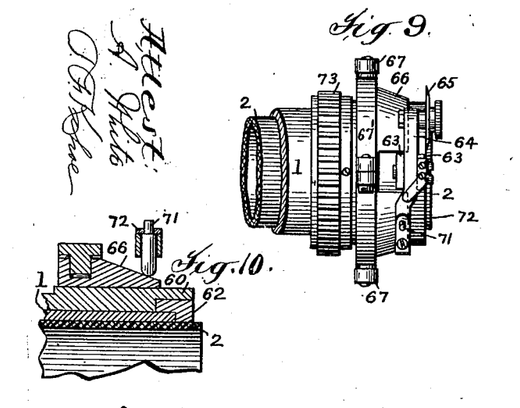
Figs. 9 and 10 are detail views illustrating certain parts of the cutting mechanism.

The cutting mechanism by which a gasket is severed from the end of the tube may be varied in construction. Preferably, however, it will be arranged to travel around the tube. The cutting mechanism may be mounted so as to travel around the tube in any suitable manner. As shown, the mechanism is mounted on the conduit itself. In the construction shown a sleeve 60 is provided, said sleeve abutting against a bracket 61, which serves to support the forward end of the conduit 1, and being held between said bracket and a ring 62, which is secured to the mouth of the conduit in any suitable manner, as by screws, the ring 62 being shouldered, as clearly shown in Fig. 12. The sleeve 60 is provided with a pair of outwardly-projecting ears or lugs 63, and between these lugs is pivoted a lever 64. This lever supports on one of its ends a disk cutter 65, which is normally out of engagement with the tube, but which may be thrown into engagement with it by any suitable mechanism. The mechanism by which the cutter is thrown into cutting engagement with the tube may be constructed in any suitable manner. As shown, a grooved cam-ring 66 is mounted on the sleeve 60, the groove in said ring being engaged by a ring 67', which is engaged by the forks 67 of a forked lever, which is pivoted in a bracket 68, depending from the under side of the bed-plate. The lower end of this forked lever carries a bowl 69, which engages a suitable groove in a cam 70, mounted on the main shaft 27. As the main shaft rotates, therefore, it will be seen that the cam-ring 66 will be given a sliding movement toward and away from the end of the tube-conduit, and therefore toward and away from the cutter. The ring is recessed, as clearly shown in Fig. 9, and this recess embraces the lugs or ears 63, so that these lugs guide the ring in its movements. It is desirable to hold the cutter against the tube with a yielding pressure, so as to compensate for any irregularity—as, for instance, any irregularity in the alinement of the support on which the gasket is cut. To this end, therefore, (see Fig. 8,) the tail of the lever 64, which supports the cutter, is provided with a shouldered pin 71, against the shoulder of which presses a leaf-spring 72. This pin is engaged by the cam-ring 66 as the same moves forward, and the cutter end of the cutter-carrying lever is thrown toward the tube to bring the cutter into cutting position. In order to cause the cutter to travel around the tube, the sleeve 60, on which it is mounted, must be driven. While this sleeve may be driven in various ways, it is preferably provided (see Figs. 6 and 8) with a gear 73, which is in mesh with a gear 74, mounted on a short shaft 75, which is supported in the bracket 23. This shaft 75 carries a pinion 76, which is in mesh with a gear 77, mounted on the main shaft 27. By this construction it will be seen that the sleeve is constantly driven, so that the cutter is given a continuous rotary movement about the tube. After a gasket has been cut from the tube the support is withdrawn, carrying the gasket. Suitable means are preferably provided for holding the support, with the gasket thereon, in its retracted position. As shown, the bedplate of the machine is provided with a semicircular guard 78, (see Fig. 7,) which is secured thereto by means of screws or in any other suitable manner. Each of the hubs 45 of the parts 43, which form a part of the supports, carries a bowl 79, (see Fig. 6,) said bowl being secured to the hub by means of a screw 80 or in any other suitable manner. The forward end of the guard 78 is so located that it will be engaged by the bowls on the supports as the carrier which sustains the supports begins to rotate, which takes place as soon as a gasket has been cut and the plunger has been withdrawn. All the supports are thus held in their retracted position. In the preferred form of the machine the gasket will be carried by the support into position to be placed in the cover or on the mouth of the receptacle with which it is to be used. As shown, the gaskets are placed in the covers of the receptacles, and to this end suitable positioning devices for the covers are employed. These devices may be of any suitable description. As shown, the covers are placed in a chute 81, which is located at a point directly opposite the feed-conduit, this chute being inclined, as shown, in order to insure regularity in the feed of the covers. At the mouth of the chute there is provided a centering-opening 82, having slightly-rounded edges, as indicated at 83. This opening is closed by a backing-block 84, said block having a stem 85, which engages a socket formed in a bracket 86, which supports the chute. This backing-block is held forward by a spring 87, which bears against the block and the edge of the socket formed in the bracket 86. If a cover as it drops from the chute is not exactly positioned with respect to the centering-opening, it will be guided into this opening by the rounded edges thereof, the backing-block yielding sufficiently to allow the cover to be properly seated in the opening.

Figure 13:
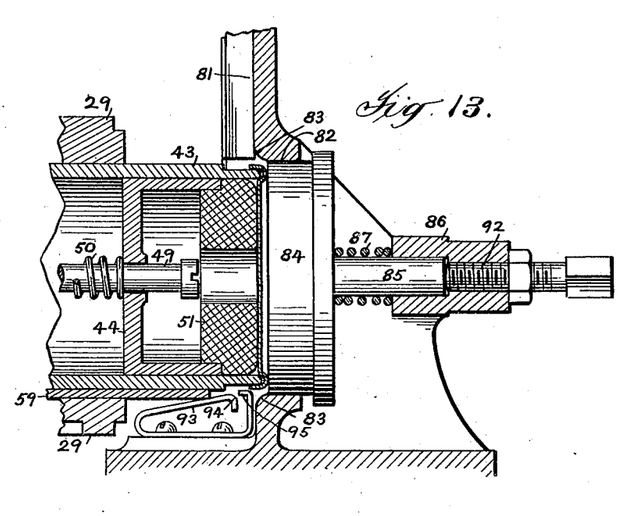
Fig. 13 is a sectional detail view, on an enlarged scale, of the parts in the position they occupy when a gasket is being inserted into a cover.

In order to transfer a gasket from the support which carries it to a cover, a relative movement must be produced between the supports and the covers. While this might be effected by moving the covers, it is preferably effected by moving the supports. Any suitable means may be employed for moving the supports; but in the construction shown a lever 88, pivoted at 89 to the bracket 35, is employed for this purpose. The lower end of this lever 89 is provided with a bowl 90, which engages a groove in a cam 91, mounted on the shaft 27, and the upper end of the lever is provided with a boss or enlargement 92', which takes behind the bottom of the outer plunger 43. The cam 91 is so timed that the movement produced by it occurs at the time when the carrier is at rest, and this movement is preferably simultaneous with that produced by the lever 52, which inserts the supports in the mouth of the tube. When, therefore, a support has come to rest in front of a cover which has been properly positioned, the lever 88 is operated by the cam 91 and drives the two-part plunger, which forms the support, forward, so that the fiber block 51 enters the cover. The spring 50, which has been described as located between the cup forming the plunger 43 and the cup forming the plunger 44, is stronger than the spring 87 in the rear of the backing-block. As the plungers forming the support move forward, therefore, the backing-block retreats until the stem 85 strikes an adjusting-screw 92, which forms the bottom of the socket in which the stem moves. When this occurs, the cover and the plunger 44 stop; but the plunger 43 continues its movement until the gasket has been stripped from the block 51 and placed in the cover, the position of the parts being clearly shown in Fig. 13. The cam 91 now allows both plungers to retreat and the spring drives the backing-block 84 forward until its edge is flush with the edge of the centering-opening. To insure that the cover will drop in proper position in front of the centering-opening, there is or may be provided a bent spring 93, (see Figs. 6 and 13,) one end of this spring being bent down, as shown at 94, and the other end bent over, as shown at 95. The cover rests on the end 95 and is held by the end 94. As the plungers move forward the bent end of the spring 94 is forced down, as is obvious, and is held down until the support is moved onward by the action of the carrier. In the preferred form of the construction the forward movement of the supports is utilized to remove the covers from their positioning devices and to carry them to a discharge-point, and means are preferably provided which operate to retain the covers on the supports. In the construction shown a guide 96 is provided for this purpose, this guide communicating directly with the positioning devices. The backward movement of the support which is permitted by the lever 88 is not sufficient, therefore, to allow the support to entirely withdraw from the cover, but is simply sufficient to allow the cover to be moved forward by the backing-block, so that it may be carried onward by the support, and it is held against the support by the guide 96.

Suitable means are provided to hold the supports forward in engagement with the covers after they have passed away from the ends of the levers 88. While these means may be of any suitable description, in the construction shown a semicircular cam 97 is provided for this purpose, said cam engaging the bowls 79, before described as mounted on the hubs 45 of the plungers 43. The guide 96 preferably terminates in a chute 98, down which the covers with their gaskets are dropped, and in order to insure the delivery of the covers at this point the cam 97 is provided with a low part 99, which permits the supports to retreat at this point. If desired, retaining or stripping flanges 100 may be secured to the edges of the guide 96, so that the covers will be retained in the guide as the supports are withdrawn.

The operation of the machine is as follows: Assuming the parts are in the position shown in Fig. 6, with a support facing the mouth of the tube which has been fed forward through the conduit, the cam 55 operates the lever 52 and causes the support to enter the mouth of the tube. The cam 70 then comes into action and moves forward the cam-ring 66 through the lever 68, so that the cutter 65 is thrown down onto the tube with a yielding pressure, the sleeve on which the cutter is mounted being constantly driven through the train of gearing, beginning with the gear 77 on the main shaft 27 and ending with the gear 73 on the sleeve 60. At the time a support is opposite the mouth of the feed-conduit another support carrying a gasket (marked 101) is opposite a cover which is dropped from the chute 81 into position to have a gasket inserted into it. Simultaneously with or substantially simultaneous with the movement of the lever 52, which is to insert a support into the mouth of the tube, the lever 88 is operated by its cam to cause the support which is in front of the cover to be moved forward to insert the gasket in the manner which has been described. When the gasket has been inserted in the cover and the support has partially retreated until the backing-block is flush with the edges of the centering-opening, the carrier 29 is given a forward movement by its pawl-and-ratchet mechanism, the support which has entered the mouth of the tube being retracted, with a gasket remaining on it, by the movement of the lever 52 and being held in its retracted position by the guard 78. In the same manner the support which has placed a gasket in the cover is held forward by the lever 88 and the cam 97, so that in the onward movement of the carrier the support which has entered the mouth of the tube advances, carrying a gasket with it, and the support which has entered the cover advances, carrying the cover with it. The plunger 3, which feeds forward the tube, is now operated through the screw 12 and its pawl-and-ratchet mechanism, so that a fresh length of the tube is fed forward, and the operations which have been before described are repeated.

While the mechanisms which have been described are effective for the purposes for which they are used, it is to be understood that the invention is not to be confined thereto, as it may be embodied in other forms of mechanisms. It is to be further understood that certain parts of the mechanism are capable of use independently of other parts and that such independent use is contemplated.

What is claimed is—

1. The combination with a support, of means for positioning the end of a tube of gasket material thereon, means for cutting a gasket from the tube, and means for causing the gasket while on the support to be delivered to that part of a receptacle which is to receive it, substantially as described.

2. The combination with a support, of means for positioning the end of a tube of gasket material thereon, means for cutting a gasket from the tube, and means for causing the gasket while on the support to be placed in position in a cover, substantially as described.

3. The combination with a support, of means for positioning the end of a tube of gasket material thereon, means for cutting gaskets from the tube, means for presenting covers to the support, and means whereby the gaskets are transferred from the support to the covers, substantially as described.

4. The combination with means for advancing a tube of gasket material, of a support, means for positioning the end of the tube of gasket material on the support, means for cutting a gasket from the tube, and means for causing the gasket while on the support to be delivered to that part of a receptacle which is to receive it, substantially as described.

5. The combination with a plurality of supports, of means for advancing a tube of gasket material, means for positioning the end of the tube on each support, and a cutter for severing the gaskets from the tube, substantially as described.

6. The combination with a plurality of supports, of means for advancing a tube of gasket material, means for positioning the end of the tube on each support, a cutter for severing the gaskets from the tube, and means for causing the gaskets while on the support to be delivered to that part of the receptacles which is to receive them, substantially as described.

7. The combination with means for advancing a tube of gasket material, of a plurality of supports, means for presenting the supports to the tube, means for positioning the end of the tube on each support as it is presented to the tube, a cutter for severing gaskets from the tube, means for presenting covers to the supports, and means for causing the gaskets to be delivered from the supports to the covers, substantially as described.

8. The combination with means for advancing a tube of gasket material, of a support, means for positioning the end of the tube on the support, means for cutting a gasket from the tube while its end is on the support, and means for producing a relative movement between the support and the tube, substantially as described.

9. The combination with a plurality of supports, of means for advancing a tube of gasket material, means for positioning the end of the tube on the supports, and means for cutting a gasket from the tube while its end is on a support, substantially as described.

10. The combination with a plurality of supports, of means for advancing a tube of gasket material, means for positioning the end of the tube on the supports, means for cutting a gasket from the tube while its end is on a support, and means for causing the gaskets while on the supports to be delivered to that part of the receptacles which is to receive them, substantially as described.

11. The combination with a plurality of supports, of means for advancing a tube of gasket material, means for positioning the end of the tube on the supports, means for cutting a gasket from the tube while its end is on a support, means for presenting covers to the supports, and means whereby the gaskets are transferred from the supports to the covers, substantially as described.

12. The combination with a plurality of supports, of means for advancing a tube of gasket material, means for positioning the end of the tube on the supports, means for cutting a gasket from the tube while its end is on a support, means for presenting covers to the supports, and means for causing the supports to insert the gaskets in the covers, substantially as described.

13. The combination with a feed-conduit, of means for advancing a flexible tube endwise therethrough, means for holding the tube in a distended condition, and means for cutting sections therefrom, substantially as described.

14. The combination with a feed-conduit, of means for advancing a tube endwise therethrough, an interior support, means for positioning the end of the tube on the support, and means for cutting sections from the tube, substantially as described.

15. The combination with a feed-conduit, of means for advancing a flexible tube endwise therethrough, means for holding the tube in a distended condition, a support, means for positioning the end of the tube on the support, and means for cutting sections from the tube, substantially as described.

16. The combination with a feed-conduit, of means for advancing a flexible tube therethrough, a loose guide in the mouth of the conduit conforming to the shape of the conduit and operating to hold the tube distended, a support, means for positioning the mouth of the tube on the support, and means for cutting sections from the tube, substantially as described.

17. The combination with a feed-conduit, of means for advancing a tube therethrough, a support, means for positioning the mouth of the tube on the support, means for cutting sections from the tube, and means for producing a relative movement between the tube and the support, substantially as described.

18. The combination with a feed-conduit, of means for advancing a flexible tube therethrough, means for holding the tube in a distended condition, means for positioning the mouth of the tube on the support, means for cutting sections from the tube, and means for producing a relative movement between the tube and the support, substantially as described.

19. The combination with a feed-conduit, of means for advancing a tube therethrough, a plurality of supports, means for positioning the mouth of the tube on the supports, and a cutter for cutting sections from the tube, substantially as described.

20. The combination with a feed-conduit, of means for advancing a flexible tube therethrough, a loose guide in the mouth of the conduit conforming to the shape of the conduit and operating to hold the tube in a distended condition, a plurality of supports, means for inserting the supports in the mouth of the tube, and a cutter for cutting sections from the tube, substantially as described.

21. The combination with a slotted feed-conduit, of a piston traveling in it, said piston operating to force a flexible tube through the conduit, a loose guide for keeping the tube distended, a support upon which the mouth of the tube is seated, and a cutter for cutting sections from the tube, substantially as described.

22. The combination with a tube-guide, of means for advancing a tube along it, a cutter, and means for causing the cutter to travel around the guide whereby sections are cut from the tube, substantially as described.

23. The combination with a tube-guide, of means for advancing a tube along it, a support on which the end of the tube is positioned, a cutter, and means for causing the cutter to travel around the guide, whereby sections are cut from the tube, substantially as described.

24. The combination with a feed-conduit, of means for advancing a tube therethrough, a cutter, and means for causing the cutter to travel around the conduit, whereby sections are cut from the tube, substantially as described.

25. The combination with a feed-conduit, of means for advancing a tube therethrough, a support on which the end of the tube is positioned, a cutter, and means for causing the cutter to travel around the conduit, whereby sections are cut from the tube, substantially as described.

26. The combination with a tube-guide, of means for advancing a tube along it, a plurality of supports, means for successively presenting the supports to the tube, means for positioning the end of the tube on each support, a cutter, and means for causing the cutter to travel around the tube-guide, substantially as described.

27. The combination with a feed-conduit, of a cutter-support mounted thereon, a cutter, means for causing the cutter to travel around the conduit, means for advancing a tube through the conduit, a plurality of supports, means for successively presenting the supports to the tube, and means for positioning the tube on each support, substantially as described.

28. The combination with a feed-conduit, of means for advancing a tube therethrough, a cutter-support mounted on the conduit, a cutter mounted on the support, a gear secured to the cutter-support, a plurality of supports, means for successively presenting the supports to the tube, and means for positioning the end of the tube on each support, substantially as described.

29. The combination with a feed-conduit, of means for advancing a flexible tube therethrough, a loose guide operating to hold the tube distended, a support, means for positioning the end of the tube on the support, a cutter, and means for causing the cutter to travel around the conduit, substantially as described.

30. The combination with a feed-conduit, of a cutter-support mounted thereon, a cutter, means for causing the cutter to travel around the conduit, means for advancing a flexible tube through the conduit, a loose guide operating to hold the tube distended, a plurality of supports, means for successively presenting the supports to the tube, and means for positioning the tube on each support, substantially as described.

31. The combination with a feed-conduit, of means for advancing a flexible tube therethrough, a loose guide operating to hold the tube distended, a cutter-support mounted on the conduit, a cutter mounted on the support, a gear secured to the cutter-support, a plurality of supports, means for successively presenting the supports to the tube, and means for positioning the end of the tube on each support, substantially as described.

32. The combination with a feed-conduit, of means for advancing a tube therethrough, a support, means for positioning the end of the tube on the support, a cutter-support mounted on the conduit, a normally inoperative cutter, means for causing the cutter-support to travel around the conduit, and means for throwing the cutter into operative position, substantially as described.

33. The combination with a tube-guide, of means for advancing a tube along it, a support, means for positioning the end of the tube on the support, a cutter-support, a cutter mounted on said support, and means for throwing the cutter against the tube with a yielding pressure, substantially as described.

34. The combination with a feed-conduit, of means for advancing a tube therethrough, a cutter-support mounted on the conduit, means for rotating said support, a cutter carried by the support, a lever connected with the cutter, a spring-pin carried by the lever, a support for the end of the tube, means for positioning the end of the tube on said support, and means operating against the spring-pin for throwing the cutter against the tube, substantially as described.

35. The combination with a feed-conduit, of means for advancing a tube therethrough, a cutter-support mounted on the conduit, means for rotating said support, a cutter carried by the support, a lever connected with the cutter, a spring-pin carried by the lever, a support for the end of the tube, means for positioning the end of the tube on said support, and a sliding cam operating against the spring-pin for throwing the cutter against the tube, substantially as described.

36. The combination with a tube-guide, of means for advancing a tube along it, a carrier, a plurality of supports mounted on the carrier, means for giving the carrier a step-by-step movement, means for positioning the end of the tube on each support, a carrier for cutting sections from the tube, and means for locking the carrier against movement when the tube and a support are engaged, substantially as described.

37. The combination with a feed-conduit, of means for advancing a flexible tube therethrough, a carrier, a plurality of supports mounted thereon, means for giving the carrier a step-by-step movement, means for inserting each support in the mouth of the tube, and a locking device operated by the movement of the support to lock the carrier in position when the tube and a support are engaged, substantially as described.

38. The combination with a feed-conduit, of means for advancing a flexible tube therethrough, a carrier, a plurality of supports mounted thereon, means for giving the carrier a step-by-step movement, means for inserting each support in the mouth of the tube, and a locking device carried by each support for locking the carrier in position when the tube and support are engaged, substantially as described.

39. The combination with a feed-conduit, of means for advancing a tube therethrough, a support including a block of yielding material, means for positioning the end of the tube on the support, and a cutter for cutting the tube while on the support, substantially as described.

40. The combination with a feed-conduit, of means for advancing a tube therethrough, a support including a block of yielding material, means for positioning the end of the tube on the support, a cutter for cutting the tube while on the support, and means for causing the cutter to travel around the support, substantially as described.

41. The combination with a feed-conduit, of means for advancing a flexible tube therethrough, a loose guide for holding the tube distended, a support including a block of yielding material, means for positioning the end of the tube on the support, a cutter for cutting the tube while on the support, and means for causing the cutter to travel around the support, substantially as described.

42. The combination with a tube-guide, of means for feeding a tube along it, a carrier, means for giving the carrier a step-by-step movement, a plurality of supports mounted on the carrier, means for inserting each support in the mouth of the tube, a cutter, and means for causing the cutter to travel around the tube-guide, substantially as described.

43. The combination with a tube-guide, of means for feeding a tube along it, a carrier, means for giving the carrier a step-by-step movement, a plurality of supports, each including a block of yielding material, mounted on the carrier, means for inserting each support in the mouth of the tube, a cutter, and means for causing the cutter to travel around the tube-guide, substantially as described.

44. The combination with a feed-conduit, of means for feeding a flexible tube therethrough, a cutter-support mounted on the conduit, means for rotating the cutter-support, a cutter mounted on said support, a carrier, a plurality of supports mounted on the carrier, means for giving the carrier a step-by-step movement, and means for inserting each of the supports in the mouth of the tube, substantially as described.

45. The combination with a two-part plunger, one part of which may move with relation to the other, and one part of which operates to support a gasket, of means for positioning a cover so that it may receive the gasket from the plunger, and means for producing a relative inserting movement between the cover and the plunger, whereby the gasket is stripped and seated in the cover, substantially as described.

46. The combination with a two-part plunger, one part of which operates to support a gasket, of means for positioning a cover so that it may receive a gasket from the plunger, means for producing a relative inserting movement between the cover and the plunger, and means for permitting the gasket-carrying part of the plunger to move with respect to the other part, whereby the gasket is stripped and seated in the cover, substantially as described.

47. The combination with means for holding a cover in position, of a two-part plunger, one part of which serves to support a gasket, means for positively advancing the plunger, and means for permitting one part of the plunger to move with respect to the other part, whereby the gasket is stripped from the gasket-carrying part, and inserted in the cover, substantially as described.

48. The combination with means for holding a cover in position, of a two-part plunger, one part of which serves to support a gasket, means for positively advancing the plunger, and means for permitting the gasket-carrying part to yield with respect to the other part, whereby the gasket is stripped from the gasket-carrying part and inserted in the cover, substantially as described.

49. The combination with means for holding a cover in position, said means including a yielding backing-block, of a two-part plunger, one part of which carries a gasket, means for advancing the plunger to insert the gasket in the cover, and means for permitting one part of the plunger to move with respect to the other part, whereby the gasket is stripped from the gasket-carrying part and inserted in the cover, substantially as described.

50. The combination with means for holding a cover in position, said means including a yielding backing-block, of a two-part plunger, one part of which carries a gasket, means for advancing the plunger to insert the gasket in the cover, means for permitting the gasket-carrying part to yield with respect to the other part, whereby the gasket is stripped from the gasket-carrying part and inserted in the cover, substantially as described.

51. The combination with a carrier, of means for giving it a step-by-step movement, a plurality of gasket-supports mounted on said carrier, a cover-holder, a guide communicating with said holder, means for advancing each support to insert a gasket into a cover, the carrier-actuating means operating to move the carrier and the supports when a support is in engagement with a cover, whereby each support is caused to remove the cover from the cover-holder and carry it along the guide, substantially as described.

52. The combination with a carrier, of means for giving it a step-by-step movement, a plurality of supports mounted thereon, each support comprising a two-part plunger, one of said parts serving to support a gasket, a cover-holder, a guide communicating with said holder, means for advancing each support to cause it to insert a gasket in the cover, means for permitting one part of the two-part plunger to move with respect to the other so that the gasket is stripped and inserted in the cover, the carrier-actuating means operating to move the carrier and the supports when a support is in engagement with a cover, whereby each support is caused to remove the cover from the cover-holder and carry it along the guide, substantially as described.

53. The combination with a carrier, of means for giving it a step-by-step movement, a plurality of supports mounted on the carrier, each support comprising a two-part plunger, one of said parts serving to support a gasket, a cover-holder including a yielding backing-block, a guide communicating with said holder, means for advancing each support to cause it to insert a gasket in the cover, a spring for permitting the gasket-carrying part of the two-part plunger to move with respect to the other part, the carrier-actuating means operating to move the carrier and the supports when a support is in engagement with a cover, whereby each support is caused to remove the cover from the cover-holder and carry it along the guide, substantially as described.

54. The combination with means for advancing a tube of gasket material, of a carrier, a plurality of supports mounted on the carrier, a cover-holder, means for simultaneously advancing two of the supports so that one enters the mouth of the tube and the other enters a cover to insert a gasket therein, means for cutting a gasket from the tube while it is on the support, and means for giving the carrier a step-by-step movment, whereby one support moves onward carrying the gasket which has been cut from the tube, and the other support removes the cover from the cover-holder, substantially as described.

55. The combination with means for advancing a tube of gasket material, of a carrier, a plurality of supports mounted on the carrier, a cover-holder, means for simultaneously advancing two of the supports so that one enters the mouth of the tube and the other enters a cover to insert a gasket therein, means for cutting a gasket from the tube while it is on the support, a guard for holding the gasket-carrying support in its advanced position, a cam for holding the inserting-support in its advanced position, and means for giving the carrier a step-by-step movement, whereby one support moves onward carrying the gasket which has been cut from the tube and the other removes the cover from the cover-holder, substantially as described.

56. The combination with means for advancing a tube of gasket material, of a carrier, a plurality of supports mounted on the carrier, a cover-holder, means for simultaneously advancing two of the supports so that one enters the mouth of the tube and the other enters a cover to insert a gasket therein, means for cutting a gasket from the tube while it is on the support, a guard for holding the gasket-carrying support in its advanced position, a cam for holding the inserting-support in its advanced position, said cam being formed to withdraw the support from the cover when it has reached a delivery-point, and means for giving the carrier a step-by-step movement, whereby one support moves onward carrying the gasket which has been cut from the tube and the other support removes the cover from the cover-holder, substantially as described.

57. The combination with means for advancing a tube of gasket material, of a carrier, a plurality of supports mounted on the carrier, a cover-holder, a guide communicating therewith, means for simultaneously advancing two of the supports so that one enters the mouth of the tube and the other enters a cover to insert a gasket therein, means for cutting a gasket from the tube while it is on the support, and means for giving the carrier a step-by-step movement, whereby one support moves onward carrying the gasket which has been cut from the tube and the other support removes the cover from the cover-holder and carries it along the guide, substantially as described.

58. The combination with means for advancing a tube of gasket material, of a carrier, a plurality of supports mounted on the carrier, a cover-holder, a guide communicating therewith, means for simultaneously advancing two of the supports so that one enters the mouth of the tube and the other enters a cover to insert a gasket therein, means for cutting a gasket from the tube while it is on the support, a guard for holding the gasket-carrying support in its advanced position, a cam for holding the inserting-support in its advanced position, said cam being formed to withdraw the support from the cover when it has reached a delivery-point, and means for giving the carrier a step-by-step movement, whereby one support moves onward carrying the gasket which has been cut from the tube and the other support removes the cover from the cover-holder and carries it along the guide, substantially as described.

59. The combination with a feed-conduit, of means for advancing a tube of gasket material therethrough, a carrier, a plurality of supports mounted on the carrier, each support comprising a two-part plunger, a cover-holder, a guide communicating therewith, means for simultaneously advancing two of the supports so that one enters the mouth of the tube and the other enters a cover, means for cutting a gasket from the tube while it is on the support, means for permitting the gasket-carrying part of the support which is in the cover to yield with respect to the other part, means for giving the carrier a step-by-step movement, and means for holding the two supports in position so that one support carries the gasket away from the tube and the other support removes the cover from the cover-holder and carries it along the guide, substantially as described.

60. The combination with a feed-conduit, of means for advancing a tube of gasket material therethrough, a carrier, a plurality of supports mounted on the carrier, each support comprising a two-part plunger, a cover-holder, a guide communicating therewith, means for simultaneously advancing two of the supports so that one enters the mouth of the tube and the other enters a cover, means for cutting a gasket from the tube while it is on the support, means for permitting the gasket-carrying part of the plunger which is in the cover to yield with respect to the other part, means for giving the carrier a step-by-step movement, a guard for holding the gasket-carrying support in position so that it carries the gasket away from the tube, and a cam for holding the inserting-support in position so that it removes the cover from the cover-holder and carries it along the guide, said cam being formed to withdraw the support from the cover when it has reached a delivery-point, substantially as described.

In testimony whereof I have hereunto set my hand in the presence of two subscribing witnesses.

ROBERT A. HALL.

Witnesses:
RUFUS L. PATTERSON,
M. M. WHEDBEE.